Dec. 24, 1929.   H. H. WEHRINGER   1,740,847
DETACHABLE LOCK FOR REMOVABLE SECTIONS OF ANTISKID CHAINS
Filed Sept. 7, 1928

INVENTOR
Herman H. Wehringer,
BY
George D. Richards
ATTORNEY

Patented Dec. 24, 1929

1,740,847

UNITED STATES PATENT OFFICE

HERMAN H. WEHRINGER, OF MONTCLAIR, NEW JERSEY

DETACHABLE LOCK FOR REMOVABLE SECTIONS OF ANTISKID CHAINS

Application filed September 7, 1928. Serial No. 304,426.

This invention relates, generally, to improvements in anti-skid chains for automobile wheels and the like; and the invention has reference, more particularly, to a quickly detachably lock for the removable tread or cross chain sections of anti-skid chains.

As commonly in use, anti-skid chains for application to automobile tires comprise a pair of circumferential carrier chains, respectively disposed on opposite sides of the tire, between and to which are connected tread or cross chain sections which extend transversely over the tread surface of the tire. In use these tread or cross chain sections are subjected to the wear and tear of traction and frequently break, thus necessitating removing of the parts and replacement thereof by new sections. Such tread or cross chain sections are now commonly provided at their ends with hook members or links to engage in links of the circumferential carrier chains, to couple the tread or cross chain sections in operative assembled relation to the latter. These hook members or links are initially provided with their hook ends open, and, when the same are coupled with the circumferential chains, said open hook ends must be bent into a closed position to prevent displacement from coupled relation to the latter. A tool is required to so bend said hook ends, and, in event of necessity of removing a tread or cross chain section, a tool must again be used to pry open said hook ends for release. Both of these operations are difficult, laborious and time consuming.

It is the primary object of my instant invention to provide a novel form and construction of quickly detachable and easily manipulated lock device for cooperation with the terminal coupling hook members or links of tread or cross chain sections, which eliminate all necessity for laboriously in-bending or out-bending the hook ends thereof, but which, nevertheless, serve to so close the hook openings as to assure strong and secure connection, against accidental displacement, of said tread or cross chain sections to the circumferential carrier chains, while at the same time enabling the user, by aid of his fingers alone, to quickly release and uncouple the ends of the tread or cross chain sections for detachment and replacement of such sections when necessary.

Other objects of my invention, not at this time more particularly enumerated, will be clearly understood from the following detailed description of the same.

My invention is clearly illustrated in the accompanying drawings, in which:—

Fig. 1 is a fragmentary side elevation of an automobile tire equipped with anti-skid chains the tread or cross chain sections of which are secured in assembled relation thereto by the novel detachable lock device made according to and embodying the principles of this invention; Fig. 2 is an enlarged rear face view of a tread or cross chain coupling hook member in engaged relation to a link of a circumferential carrier chain, and showing the novel lock device of this invention cooperatively assembled therewith; Fig. 3 is a vertical longitudinal section, taken on line 3—3 in Fig. 2; Fig. 4 is a transverse horizontal section, taken on line 4—4 in said Fig. 2; Fig. 5 is in part a side elevation and in part vertical longitudinal section of one form of the novel lock device alone; Fig. 6 is a transverse vertical section, taken on line 6—6 in Fig. 5; Fig. 7 is a perspective view of the main body of the lock device before the resilient nosing is mounted thereon; and Fig. 8 is a perspective view of the complete lock device of composite metal and rubber construction.

Fig. 9 is a perspective view of the complete lock device made entirely of rubber.

Fig. 10 is a face view of a modified form of the novel lock device; and Fig. 11 is a vertical longitudinal section through the same, taken on line 11—11 in Fig. 10.

Similar characters of reference are employed in all of the hereinabove described views, to indicate corresponding parts.

Figure 1:
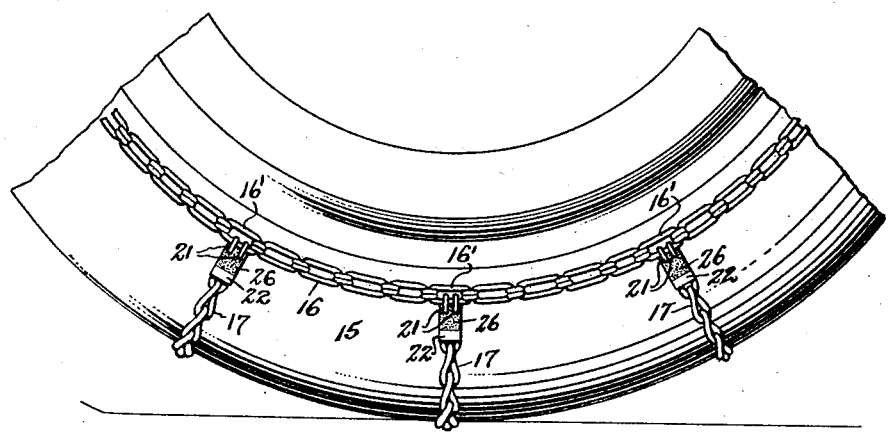
Figure 1:
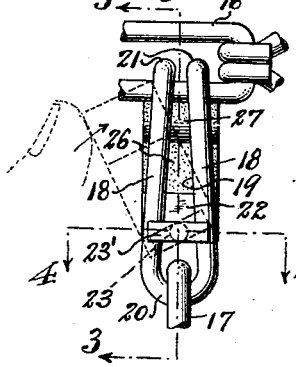
Figure 1:
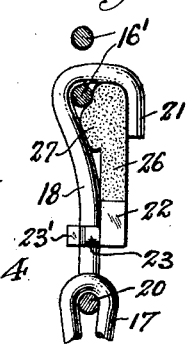
Figure 1:
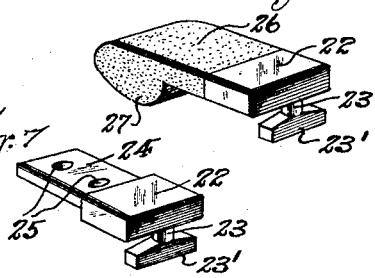
Figure 1:
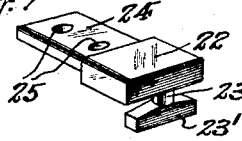
Figure 1:
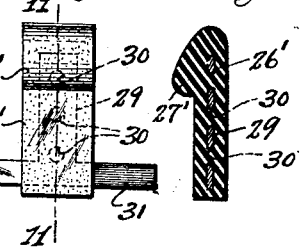
Figure 1:
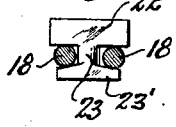
Figure 1:
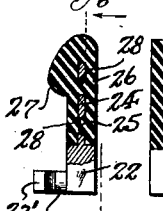
Figure 1:
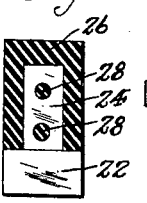
Figure 1:
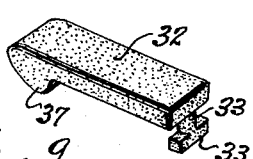

Referring now to Figs. 1 to 8 inclusive of the drawings, the reference character 15 indicates an automobile tire over which is mounted an anti-skid chain including circumferential carrier chains 16, which, in practice are arranged one along each side of the tire 15. Connected to and between said carrier chains 16, so as to extend transversely across the tread surface of the tire 15, are circumferentially spaced tread or cross chain sections 17 provided at their terminals with hook members or links to hook into links, such as links 16', of the carrier chains so as to operatively couple said tread or cross chain sections 17 with the latter.

Said terminal hook members or links of the tread or cross chain sections consist in a substantially U-shaped body or shank comprising laterally spaced side bars 18 providing an intermediate open space 19, said side bars 18 being connected at their inner ends with a loop portion 20 to engage through an adjacent link of the tread or cross chain section, and said side bars respectively terminating at their outer ends in open hook elements 21, the free ends of which may be inserted in and through a link 16' of the carrier chain 16 (preferably from the inner side of said link 16' to pass outwardly therethrough), thus effecting a coupled engagement of an end of a tread or cross chain section 17 with a carrier chain 16.

The lock device of this invention for retaining a tread or cross chain hook member or link against accidental separation or detachment from operative coupled connection with a carrier chain, comprises a novel structure adapted for separable operative attachment to said hook member or link whereby it serves to close the hook openings against outward displacement of the carrier chain link 16' therefrom. This novel structure, in one form thereof as illustrated in Figs. 1 to 8 inclusive of the drawings, comprises a main body 22 from the inner side of which projects a laterally disposed T-member consisting in the shank 23 and the lateral cross-head 23' on the outer end of said shank and spaced from the main body 22. Extending longitudinally from one end of said main body 22 is a tongue 24 of reduced cross-section, and preferably provided with perforations 25 or other suitable forms of recesses, the purpose of which will presently appear.

Molded on and around said tongue 24 as a core, and so as to join and extend from said main body 22, is a resilient end-member 26 of soft rubber, the outer or free end portion of which is shaped to provide a resilient lock nosing 27 laterally off-set from rear face of said end member 26. It will be obvious that, the rubber body, when molded on to the tongue 24 will have portions, as 28 (see Figs. 5 and 6), extending through the recesses or openings 25 of the tongue 24, whereby the said rubber body is securely and inseparably interlocked with the latter, and in operative assembled relation to the main body 22.

To apply the novel lock device to a tread or cross chain hook member, the T-member of the body 22 is first disposed parallel to the open space 19 intermediate the side bars 18 of the hook-member body or shank so that the cross-head 23 may be inserted therethrough, whereupon the body 22 is given a quarter turn to dispose the cross-head 23 transversely over the rear side of the hook-member body or shank and in stopped engagement with the side-bars 18 thereof, thus interlocking the device in retained relation to the hook-member. By producing the quarter turn of the body 22, the lock device is brought into longitudinal alignment with and disposed along the front of the hook-member, and at the same time the free end of the resilient end member 26 enters sidewise into the curve of the hook elements 21 and intermediate the same and the carrier chain link 16' through which the hook elements 21 are engaged, while the resilient lock-nosing 27 is compressed and forced into strong frictional engagement with the side bars 18. In this manner the end member 26 and its nosing 27 will be composed between the opposed inner faces of the side bars 18 and hook elements 21 of the hook member, so that the tension developed by such compression thereof exerts a strong frictional mutual inter-engagement of the parts against accidental separation, while at the same time wholly blocking the hook openings against passage of the carrier chain link 16' therethrough.

It will be obvious from the above description, and from an inspection of the drawings, that a very practical and efficient separable lock device for the purposes mentioned is provided by this invention; the same being easily manipulated by the fingers of the user alone in either the operation of attaching or detaching the same from a tread or cross chain hook member, and yet by reason of the compression and tension of the resilient lock nosing 27 of the device, the same will be firmly held against accidental displacement when operatively attached to said hook member.

While it is perhaps preferable to provide the lock device in the composite form above-described, in which the base or body and its T-member are of metal with only the end member and its lock nosing 27 made of soft rubber, yet, broadly considered, I do not limit my invention to such composite form, since it is quite practical to produce the device in its entirety as an integral molded body of rubber. This latter form is shown in Fig. 9, in which the reference character 32 indicates the body, 33 the shank, 33' the crosshead of the T-member, and 37 the lock nosing, all integrally united in a one-piece molded comparatively soft rubber formation.

It will also be understood that many variations from the specific arrangement of united rigid body and resilient lock-nosing portions of the device above described may be produced within the spirit and scope of this invention as defined in the appended claims.

For example, another modified form of the novel lock device is illustrated in Figs. 10 and 11 of the drawings. As therein shown the lock device comprises a sheet metal base member 29, provided with perforations 30, and upon and around which is molded a resilient rubber body 26' having laterally off-set from its upper terminal portion the resilient lock-nosing 27'. Connected with the lower end of said base member 29 are oppositely extending exteriorly projecting lateral arms 31. The device in this modified form is applied to the tread or cross chain hook-member by sliding its upper end and lock nosing 27' sidewise into the hook member in substantially the same manner and in substantially the same relation thereto as already above described, and thereupon bending the metal arms 31 around the side bars 18 of the hook member, which latter operation may be easily accomplished by the fingers of the operator. The arms 31, when thus bent, retain the device against outward displacement from the hook member.

It will be understood that the novel lock device of this invention may be made in various sizes adapted to accommodate the same to various sizes of anti-skid chain sets.

Having thus described my invention, I claim:—

1. A lock for cross chain coupling hooks of anti-skid chains, comprising a body having means to separably and pivotally connect the same with the shank of a coupling hook, said body having at its free end an enlarged resilient compressible portion for insertion across the opening of the hook intermediate the hook ends and hook shank so as to close said opening, said insertion being effected by the turning of said body about its pivotal connection with said coupling hook, said compressible portion being frictionally held against displacement under the force of its compression.

2. A lock device for cross chain coupling hooks of anti-skid chains, comprising a rigid base member having projecting pivotal means to separably connect the same with the shank of a coupling hook, a resilient end member having an enlarged compressible lock nosing, said end member being fixedly united to said base member, said end member and its lock nosing being adapted by turning said projecting pivotal means with respect to said coupling hook shank for insertion across the opening of the hook intermediate the hook ends and hook shank and in closing relation to the hook opening and being frictionally held against displacement under the force of its compression.

3. A lock device for cross chain coupling hooks of anti-skid chains, comprising a body having a transverse T-member laterally projecting from the inner face thereof and adapted for insertion through an opening in the hook shank so that on turning the body into longitudinal alignment with the hook shank said T-member interlocks with the latter to connect said body therewith, said body having at its free end a compressible portion for disposition intermediate the hook ends and hook shank to close the opening of the hook when said body is turned to longitudinal alignment with the hook shank, said compressible portion being frictionally held against displacement under the force of its compression between said hook ends and hook shank.

4. A lock device for cross chain coupling hooks of anti-skid chains, comprising a rigid base member having a transverse T-member laterally projecting from the inner face thereof and adapted for insertion through an opening in the hook shank so that on turning the base member into longitudinal alignment with the hook shank said T-member interlocks with the latter to connect said base member therewith, a resilient end member having an enlarged compressible lock nosing, said end member being fixedly united to said base member, said end member and its lock nosing being adapted for insertion intermediate the hook ends and hook shank to close the opening of the hook when said base member is turned to longitudinal alignment with hook shank, said end member and its lock-nosing being frictionally held against displacement under the force of compression between said hook ends and hook shank.

5. A device of the kind and for the purposes, described, comprising a body having rigid means adjacent one end to removably connect the same with a hook member to be served thereby, and having a resilient compressible portion at its opposite end and molded to said rigid means and adapted for insertion into the open end of said hook member to close the opening thereof.

6. A device of the kind and for the purposes described, comprising a metallic base having integral means to removably and pivotally connect the same with a hook member to be served, and an end member of compressible rubber fixedly united to said base, said end member being adapted for sidewise insertion into the open end of said hook member under compression to thereby close the opening of the latter.

7. A device of the kind and for the purposes described, comprising a metallic base having integral means to connect the same with a hook member to be served, and an end member of compressible rubber fixedly molded to said base, said end member having an off-set lock nosing, and said end member with its lock nosing being adapted for sidewise insertion into the open end of said hook member under compression to thereby close the opening of the latter.

In testimony, that I claim the invention set forth above I have hereunto set my hand this 6th day of September, 1928.

HERMAN H. WEHRINGER.